Aug. 15, 1944.  R. G. PLUMLEY ET AL  2,356,002
TREATMENT OF PLASTIC BEAD CHAINS AND THE LIKE
Filed Nov. 8, 1941  3 Sheets-Sheet 3
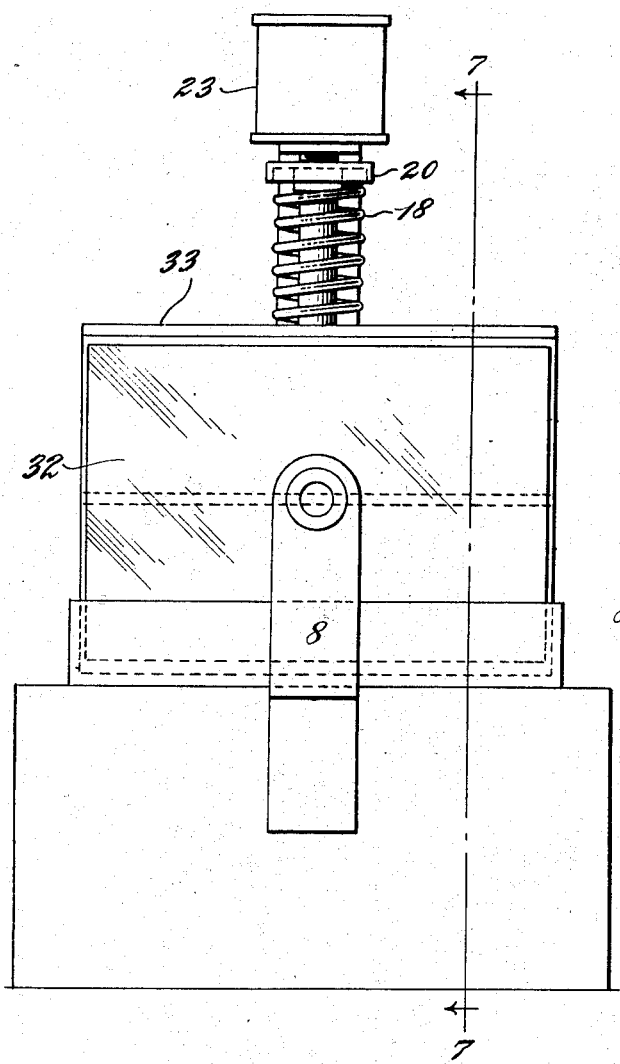
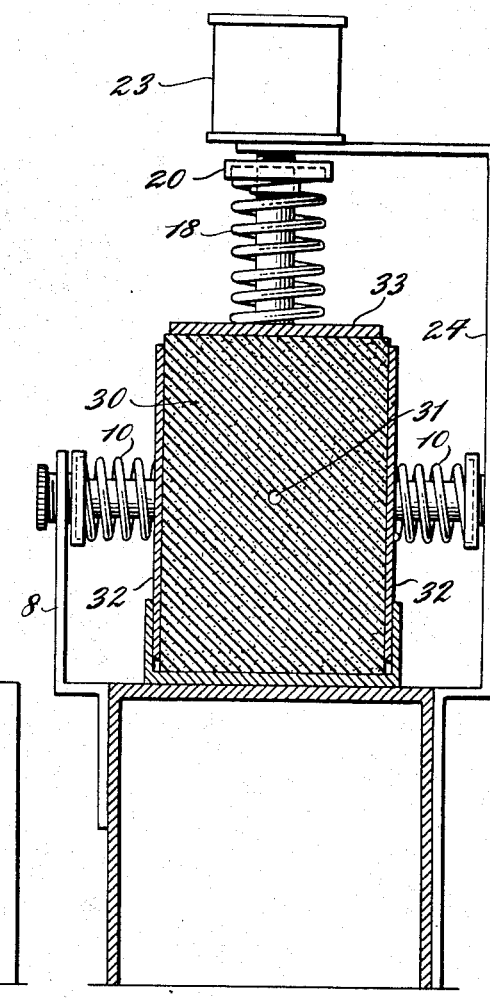
INVENTOR.
Richard G. Plumley
Frederick E. Lohse
BY
ATTORNEYS Patented Aug. 15, 1944

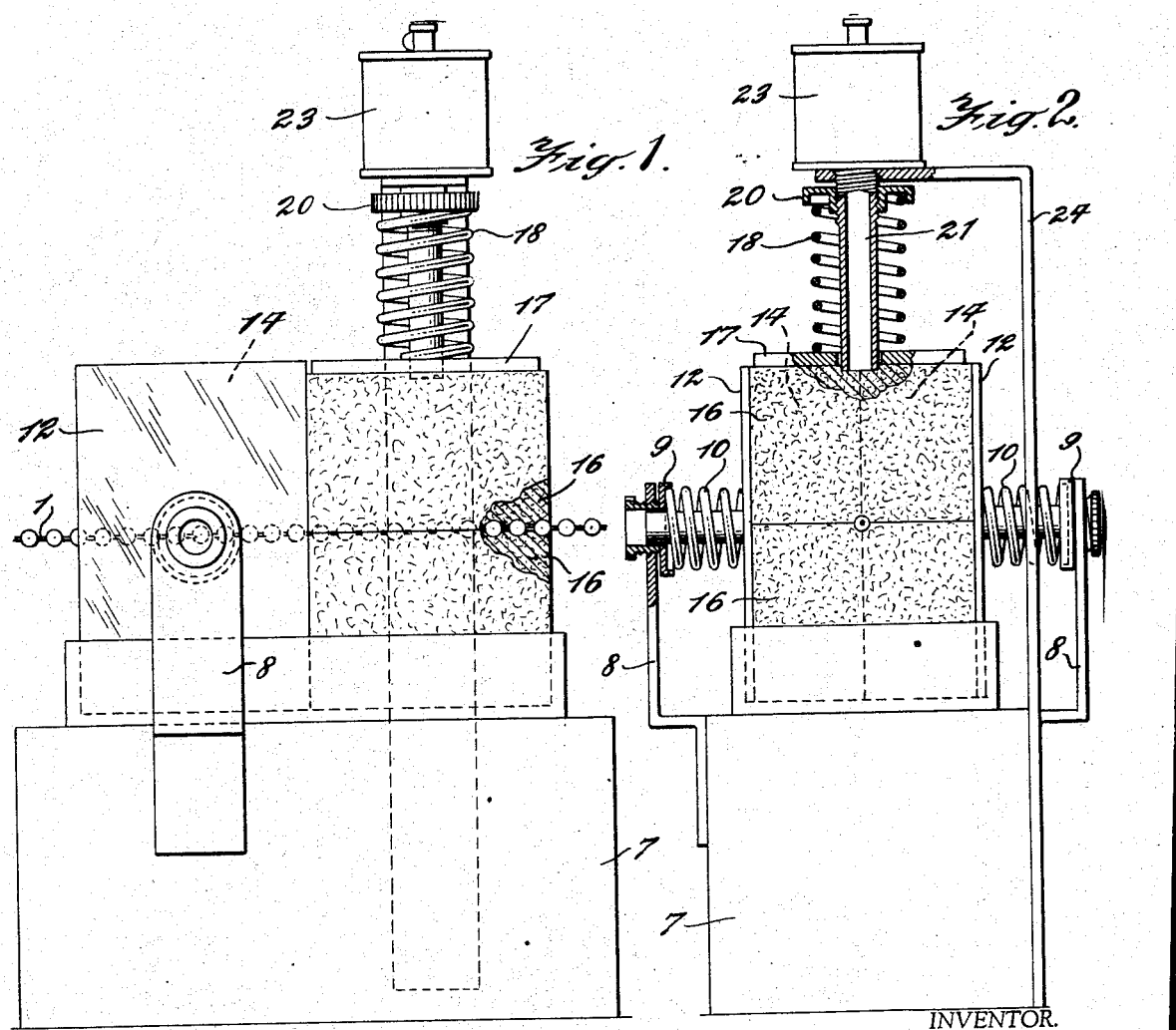

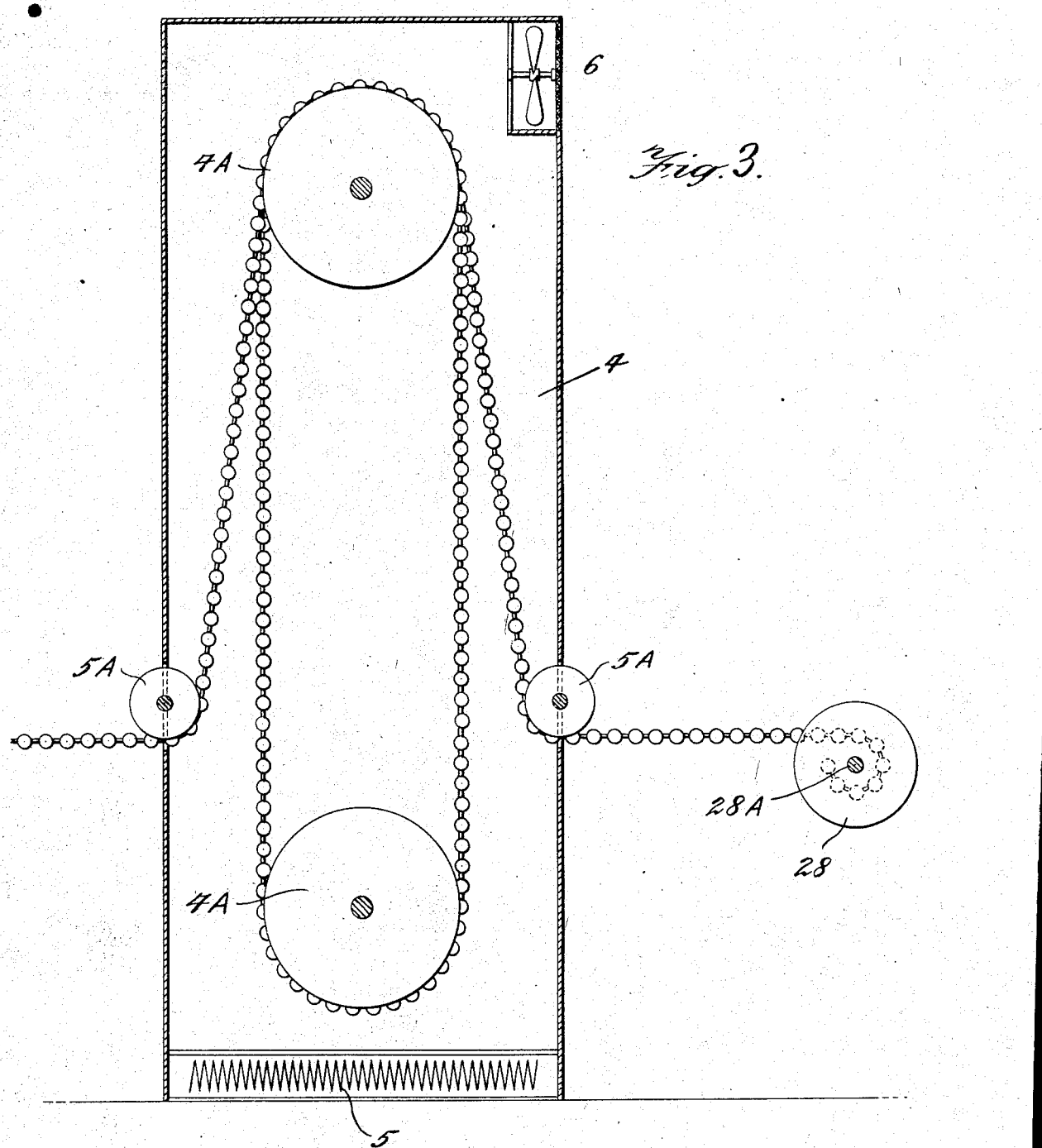

2,356,002

UNITED STATES PATENT OFFICE 2,356,002

TREATMENT OF PLASTIC BEAD CHAINS AND THE LIKE

Richard G. Plumley, Glenbrook, Conn., and Frederick E. Lohse, Barrington, R. I., assignors to Crown Fastener Corporation, Warren, R. I., a corporation of Delaware Application November 8, 1941, Serial No. 418,428

2 Claims. (Cl. 18—48)

This invention relates to a method of treatment of an article comprising a series of bodies mounted on a strand. To illustrate but not limit the type of article adapted for treatment in accordance with the present invention, there may be mentioned pulls and chains for operating electric switches on lamps and other apparatus, bead chains, bracelets, necklaces, beaded cords and the like. Such articles may be manufactured by continuously casting or molding thermoplastic material on a suitable strand. In the manufacture of such articles, irregularities or imperfections may appear on the surface thereof which impair the utility and appearance of the article. For instance, when the plastic is cast on the strand, a roughness will result at the point where the casting sprue is broken off the casting.

The object of the present invention is to provide an improved method for removing such imperfections.

The invention is capable of application, in general, to a series of bodies, of the character indicated, mounted on a strand where the composition of such bodies is of a nature making it susceptible to softening by the application of a suitable solvent.

In accordance with this invention in one of its forms, a series of beads or the like mounted on a strand are moved in frictional and pressure engagement with opposed applicator elements which are of an absorbent, resilient character and possess solvent-carrying properties, the purpose of this movement being to soften the irregularities and rub them off or smooth them out by a combination of the softening and abrading properties developed by this movement in contact with the applicators. By suitably arranging opposed surfaces of the applicator and passing the bodies mounted on the strand in contact therewith, it is possible to effect adequate frictional and pressure contact of pairs of opposed applicator surfaces with corresponding pairs of opposed surfaces arranged about the periphery of the body mounted on the strand.

In accordance with another and specifically different form of the invention, a mass of absorbent, resilient solvent carrying material may be confined between retaining or confining walls capable of adjustment, if desired, to vary the degree to which the material is compressed and a channel through the mass is provided, to permit the bodies mounted on the strand to pass through said channel in pressure-contact with the walls of said channel. In the case of sponge rubber, for example, the great resilience of that material permits the mounted bodies to pass through a channel having a cross section materially smaller than the cross section or sections of the said bodies.

The material of which the applicator bodies are composed should be characterized by sufficient absorptivity and capillarity to carry solvent and sufficient resiliency to yieldingly follow the contours of the varied objects or bodies with which they come in contact while at the same time being sufficiently rupture-resistant to avoid undue disintegration by the movement of said bodies in frictional and pressure engagement therewith. Among the numerous materials which may be employed for the purpose, felt and sponge rubber may be stated by way of illustration.

It has been found that not only may unsightly protuberances (such as fins, sprues and the like, resulting from the casting or other operations) be removed, but also that other imperfections (which otherwise might remain after this removal operation or be present owing to other causes) are removed without marring the contours and that the general appearance of the product is improved and that the entire finishing treatment may be accomplished in one operation.

In the further description of the invention reference may be had to the accompanying drawings, in which:

Fig. 1 is a side elevation of apparatus which may be employed for removing irregularities from bodies of the character described;

Fig. 2 is an end view partly in section of the apparatus of Fig. 1;

Fig. 3 is diagrammatic view of a chamber for volatilizing solvent;

Fig. 4 is a diagrammatic form of a structure specifically different from that of Figs. 1 to 3;

Fig. 5 is a section on the line 7—7 of Fig. 4.

The principles of the invention will be defined in the claims.

In the arrangement shown in Figs. 1 and 2, two pairs of felt or sponge pads or blocks are supported on the platform 7, one pair 14, 14 at the left of Fig. 1 having their meeting faces in a vertical plane and the other pair 16, 16 at the right of Fig. 1 having their meeting faces in a horizontal plane. Plates 12 on the opposite sides of the pair of blocks 14 are pressed toward the blocks by the springs 10, the tension of which may be adjusted by the nuts 9 threaded in the upper ends of brackets 8 attached to the platform 7. Above the uppermost block 16 is a plate 17 pressed against the block by spring 18, the tension of which may be adjusted by the nut 20 threaded on a pipe 21 held in the bracket 24 attached to the platform 7. The several springs serve to press the meeting faces of the respective blocks together under any desired pressure.

A solvent reservoir 23 is connected to the upper end of tube 21, the lower end of the tube extending through plate 17 to the upper felt 16. By this means, the blocks may be kept wetted by the solvent, the rate of flow of solvent from the reservoir being controlled by any suitable valve. While the one supply reservoir 23 and pipe 21 will usually be sufficient, if desired, the blocks 14 may also be provided with a similar solvent feeding reservoir and supply pipe to supply solvent directly to those blocks also.

In operation of the device shown in Figs. 1 and 2, an article, as for example a chain of beads made by casting a cellulose acetate plastic on a flexible strand, is passed through each pair of applicator elements, wet with a suitable solvent, e. g. acetone, and the degree of pressure on the beads as they are passed through and in frictional engagement with the applicator elements is adjusted and controlled to effect the desired softening of and removal of irregularities. For instance, the beaded chain may be moved to the left in Fig. 1 when a single reservoir only is used. In that case, the beads may have a considerable amount of solvent applied to them by the blocks 16, this solvent being then spread on the beads, or even partially removed, by the drier blocks 14. Obviously, if each set of blocks is supplied with its own reservoir, then it would be immaterial in which direction the beads moved.

Preferably, after leaving the blocks or pads, the chain passes through the volatilizing chamber or drier 4, over guide rolls 4A and 5A, as shown in Fig. 3. The chamber 4 is provided with heating means 5 and a fan 6 to withdraw vapors from the chamber. Any suitable means may be employed for effecting the passage of the bead chain in contact with the applicator elements, as for example by driving one or more of the rollers shown in Fig. 3. The treated and dried product may be wound on arbor or drum 28 fixed to shaft or mandrel 28A rotated by any suitable means.

In the arrangement described, since the beads pass successively between spring-pressed vertical and horizontal faces on the blocks, substantially the entire surface of each bead will be subjected to a wiping action by the solvent moistened felt or sponge so as to ensure the softening and smoothing of any roughness on any part of the surface of the bead.

It will of course be understood that the particular apparatus illustrated in Figs. 1 and 2 is one of several means which may be provided to press the applicator elements into contact with pairs of oppositely disposed surfaces of the beads or other bodies, said pairs of surfaces being disposed about the periphery of said bodies in order to bring substantially the entire periphery thereof into frictional engagement with the applicator elements.

Referring to Figs. 4 and 5, the parts are arranged generally and numbered as in Figs. 1 and 2, the specific difference being that instead of pairs of solvent-carrying elements, a single mass of solvent-carrying material 30, e. g. sponge rubber, is provided having a channel 31 running through it. The cross section, if made of sponge rubber may advantageously be somewhat less than that of the bodies to be passed therethrough. Side walls 32 and top wall 33 are provided to serve as retaining means and in the event that it is desired to compress the mass 30, spring means are provided for this purpose, as explained in connection with Figs. 1 and 2. Solvent reservoir 23 is also provided to keep the mass 30 wet with solvent.

We claim:

1. The method of removing irregularities from the surfaces of a series of normally hard bodies mounted on a strand, said bodies being susceptible to softening by the action of a solvent, which process comprises moving said bodies in frictional and pressure engagement with opposed absorbent, resilient, solvent-carrying applicator elements, while pressing said opposed applicator elements into contact with pairs of oppositely disposed surfaces of said bodies, which pairs of surfaces are arranged about the periphery of said bodies.

2. In the manufacture of an article comprising a series of normally hard bodies mounted on a strand, said bodies being susceptible to softening with a solvent, the improvement which comprises moving said strand with said bodies mounted thereon longitudinally through a path coaxial with the axis of the strand and during said movement pressing into contact with the surfaces of said bodies a mass of porous, absorptive, resilient, yielding and rupture-resistant material containing solvent absorbed therewithin whereby said surfaces are wiped by said material and wetted with said solvent and surface irregularities are removed therefrom, and thereafter evaporating solvent from said bodies and strand.

RICHARD G. PLUMLEY.
FREDERICK E. LOHSE.